July 29, 1924.
J. G. CAGLE
1,502,711
GROUNDWORKING MEMBER
Original Filed March 22, 1922
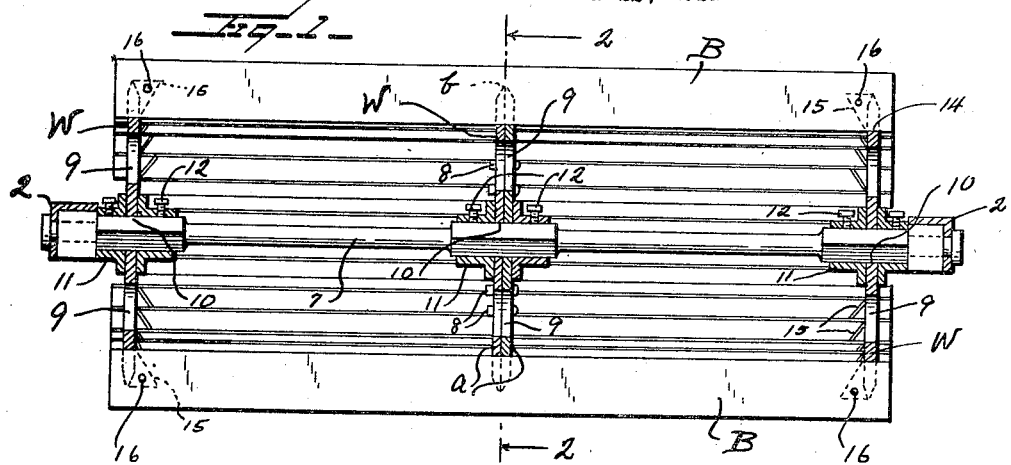
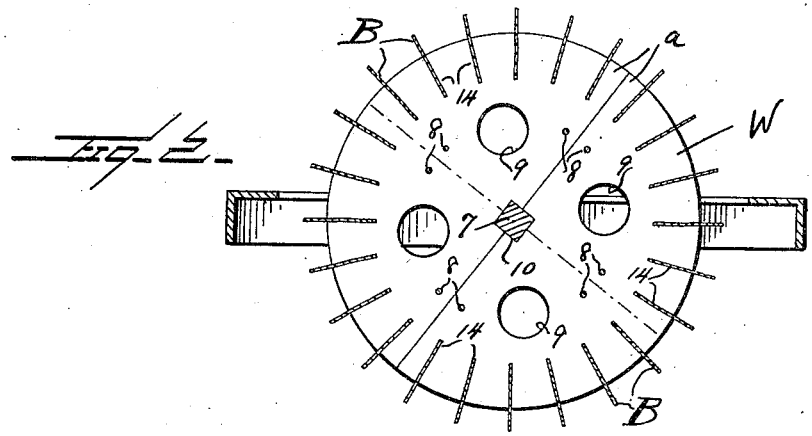
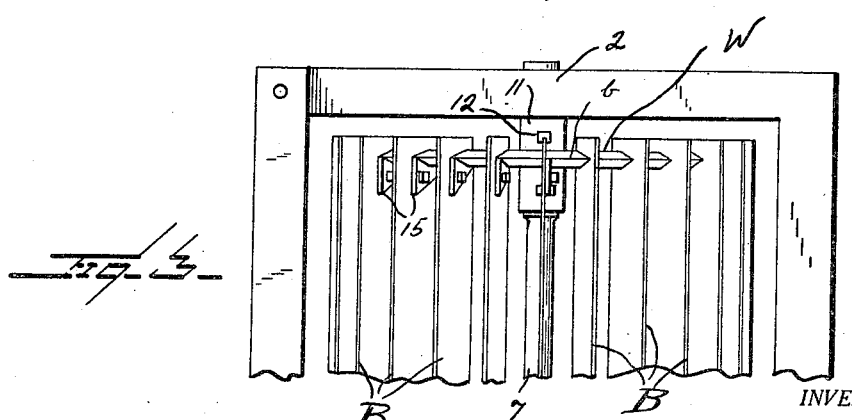
INVENTOR.
J. G. Cagle
BY Watson E. Coleman
ATTORNEY.

Patented July 29, 1924.

1,502,711

UNITED STATES PATENT OFFICE.

JAMES G. CAGLE, OF MARION, ILLINOIS.

GROUNDWORKING MEMBER.

Original application filed March 22, 1922, Serial No. 545,724. Divided and this application filed August 25, 1923. Serial No. 659,337.

*To all whom it may concern:*

Be it known that I, JAMES G. CAGLE, a citizen of the United States, residing at Marion, in the county of Williamson and State of Illinois, have invented certain new and useful Improvements in Groundworking Members, of which the following is a specification, reference being had to the accompanying drawings.

This invention relates to certain improvements in ground working members and has relation more particularly to a device of this general character especially designed and adapted for use in the pulverizing of soil and it is an object of the invention to provide a novel and improved device of this general character constructed in a manner to treat the soil without producing furrows and ridges but creating a uniform surface to permit a drill or seeder to be run in any direction or angle on the field and which also operates effectively to cut and crush clods and turf and lift the same to the surface, sifting the fine dust or comminuted soil below where the grain requires the moisture storage, bringing of the clods or turf to the surface exposing the same to the rain and for later cultivation.

The invention consists in the details of construction and in the combination and arrangement of the several parts of my improved ground working member whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diametrical section through a pulverizer constructed in accordance with my invention;

Figure 2 is a section on the line 2—2 of Figure 1;

Figure 3 is a fragmentary top plan view.

As herein disclosed, my improved ground working member comprises an axle 7 adapted to be supported as at 2 by the end members of a suitable frame and particularly a frame of the type shown in my pending application Serial No. 545,724 of which the present application is a division.

Carried by the axle 7 at points spaced thereon are the wheels W and as herein disclosed the wheels W are three in number. Two of the wheels being in close proximity to the frame and a third wheel positioned substantially midway thereof.

Each of the end wheels W is of a solid or disc type and the intermediate wheel comprises two overlying sections with each of said sections radially divided into two parts $a$ with the straight edges of the parts $a$ of one wheel section substantially at right angles to the straight edge portions of the parts $a$ of the second section. The sections of the wheel are maintained in assembled relation through the medium of the bolts 8, said bolts being eight in number and divided into pairs. The bolts 8 of each pair are arranged at opposite sides of the straight edges of the parts $a$ of a section of the wheel. The peripheral portion of the wheel W is beveled so that the perimeter of the wheel is provided with a continuous cutting edge $b$ so that said wheels, when the device is in transit, will cut into the soil and not pack the same.

Each of the wheels W is also provided with relatively large openings 9. The central portion of each of the wheels W is provided with an angular opening 10 which is adapted to snugly receive an angular portion of the axle 7 whereby the axle 7 and the wheels W will be caused to rotate in unison. The remaining portions of the axle 7 are round in cross section. After a wheel W has been properly positioned upon the axle 7, the same is maintained against displacement through the medium of the holding collars 11 positioned at opposite sides of the wheel W and contacting therewith, said holding collars being locked in working position through the instrumentality of the binding or set screws 12.

The wheels W in their peripheral portions are provided therearound with the circumferentially and equi-distantly spaced slots 14, said slots being radially disposed and open at their outer ends. The outer or end wheels W have a longitudinal edge of each of the slots 14 defined by an inwardly directed flange 15. When the wheels W are mounted upon the axle 7, the slots 14 of all of the wheels are in longitudinal alinement so that the slots may receive the blades B. The blades B loosely seat within the slots 14 of the intermediate wheel but the extremities of the blades are bolted, as at 16, whereby the blades B are effectively maintained in applied position yet can be readily removed for sharpening or for replacement as required.

By having the intermediate wheel W formed in sections, this wheel can be removed from applied position without the necessity of removing the blades B. This is of particular advantage for purposes of repair or replacement.

As the device travels over a field, the softer parts of the soil are cut when first contacted with by the blades B and as each of the blades passes to a vertical position or center, the entire weight of the machine is dropped on the clod or turf offering the greatest resistance, thereby effectively cutting the same. In practice, it is preferred that adjacent blades be separated or spaced apart four inches and which will be the maximum size to which the clods or turf will be reduced.

With a device or implement as herein disclosed, the field treated thereby is free of furrows and ridges and is formed into a uniform surface so that a drill or seeder may be run in any direction on or angular of the field. The device or machine may also be employed as a stalk cutter by removing the blades B as may be required.

When the machine or device is in operation, the blades B will crush and cut clods and turf and lift them to the surface, sifting the fine dust beneath where the seeds and grain needs most the moisture storage for the grain bed. The clods and turf are not only brought to the surface where they are exposed to later cultivation and rain, but they are all cut to maximum size. In view of the foregoing, considerable time is saved in the working of a field as it is only necessary to go over the ground a single time with my improved device as no overlapping is required.

From the foregoing description it is thought to be obvious that a ground working member constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the class described comprising an axle, said axle adjacent its ends at its central portion being angular in cross section, wheels mounted upon said angular portions of the axle, collars slidably mounted on each of said angular portions at opposite sides of the wheel thereon, means carried by the collars and engaging the axle for holding the collars in contact with said wheel, blades substantially radially disposed with respect to the axle and engaged with the peripheral portions of the wheels, the intermediate wheel comprising two overlying sections, each of said sections being radially divided into two parts with the straight edges of the parts of one section being angularly related to the straight edges of the parts of the second section, and removable means disposed through the overlying sections of the wheel and arranged at opposite sides of the straight edges of the parts of the sections.

In testimony whereof I hereunto affix my signature.

JAMES G. CAGLE.